United States Patent [19]
Killian

[11] Patent Number: 5,850,771
[45] Date of Patent: Dec. 22, 1998

[54] NON-CONTINUOUS COMPONENT APPLICATOR

[75] Inventor: Thomas Michael Killian, Sobieski, Wis.

[73] Assignee: Kimberly-Clark Worldwide, Inc., Neenah, Wis.

[21] Appl. No.: 762,178

[22] Filed: Dec. 9, 1996

[51] Int. Cl.$^6$ ............................................. B32B 31/18
[52] U.S. Cl. ........................... 83/23; 83/423; 83/435.12; 83/177
[58] Field of Search ............................ 83/435.11, 177, 83/423, 422, 23, 435.12

[56] References Cited

U.S. PATENT DOCUMENTS

| | | | |
|---|---|---|---|
| 3,628,408 | 12/1971 | Rod | 83/423 |
| 3,780,921 | 12/1973 | Harp | 83/423 |
| 4,081,301 | 3/1978 | Buell | 156/164 |
| 4,241,629 | 12/1980 | McDowell | 83/423 |
| 4,274,318 | 6/1981 | Passafiume et al. | 83/177 |
| 4,417,935 | 11/1983 | Spencer | 156/80 |
| 4,498,944 | 2/1985 | Krause et al. | 156/205 |
| 4,543,154 | 9/1985 | Reiter | 156/73.1 |
| 4,610,751 | 9/1986 | Eschler | 156/517 |
| 4,642,109 | 2/1987 | Bradley et al. | 604/385 Z |
| 4,648,928 | 3/1987 | Ales | 156/164 |
| 4,900,384 | 2/1990 | Sanders et al. | 156/204 |
| 4,908,247 | 3/1990 | Baird et al. | 428/34.9 |
| 4,946,539 | 8/1990 | Ales et al. | 156/495 |
| 5,000,806 | 3/1991 | Merkatoris et al. | 156/161 |
| 5,032,120 | 7/1991 | Freeland et al. | 604/385.2 |
| 5,156,793 | 10/1992 | Buell et al. | 264/288.8 |
| 5,396,978 | 3/1995 | van der Klugt | 198/377 |
| 5,411,618 | 5/1995 | Jocewicz, Jr. | 156/164 |
| 5,427,005 | 6/1995 | Breton | 83/423 |
| 5,592,864 | 1/1997 | Breton | 83/423 |

Primary Examiner—M. Rachuba
Assistant Examiner—Sean A. Pryor
Attorney, Agent, or Firm—Paul Yee

[57] ABSTRACT

A distinctive method and apparatus (20) technique for intermittently applying a component (22) onto a moving substrate (26). The method and apparatus can include a conveyor (28) configured to provide the moving substrate (26) at a selected substrate speed, and a transporter (30) configured to deliver a component web (24) at a selected component web speed which differs from the substrate speed. A rotatable applicator roll (32) has an appointed rotational direction (36), and an outside applicator surface (34). The applicator roll is configured to be rotated at a rate which provides to the applicator surface (34) a surface speed which is substantially equal to the substrate speed. At least one deceleration carriage (40) is assembled to rotate with the applicator roll (32) and is configured to receive and hold a selected portion of the component web (24). The deceleration carriage is configured to translate along a carriage movement path (42) from an appointed first position (44) to an appointed second position (46) while moving substantially opposite to the rotation direction (36), and is configured to be repositionable along a carriage return path (50) to the first position (44). A divider, such as rotary cutter (52), coordinates with the applicator roll (32) to intermittently separate the component web (24) into individual component web segments (22), which can then be assembled to the moving substrate (26).

35 Claims, 6 Drawing Sheets

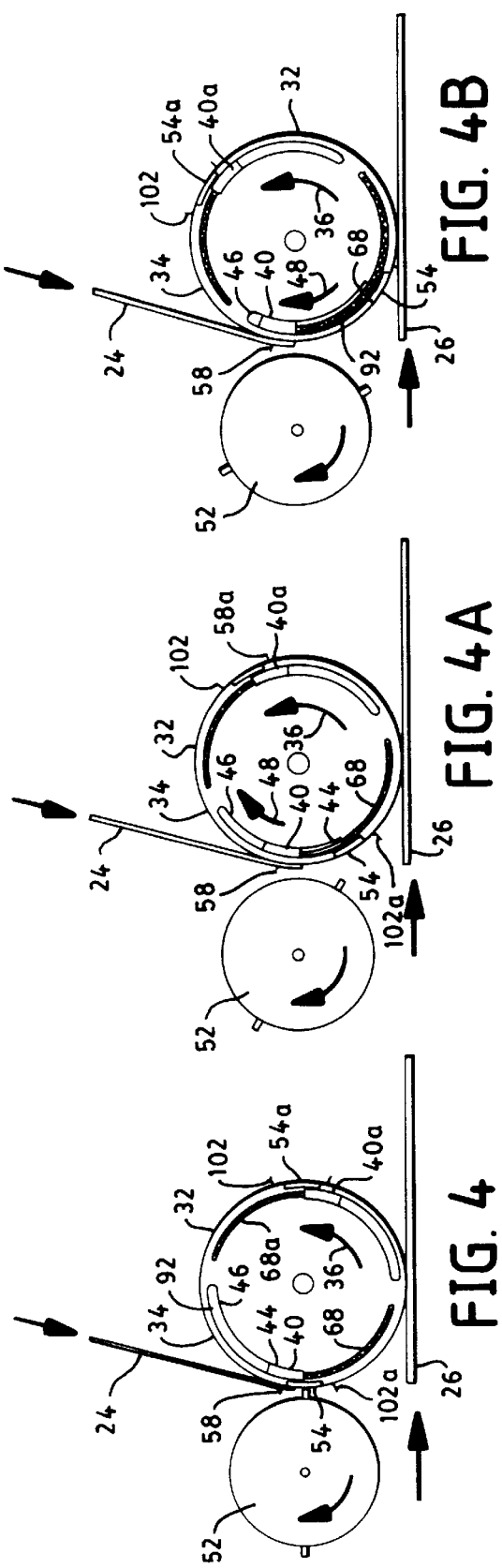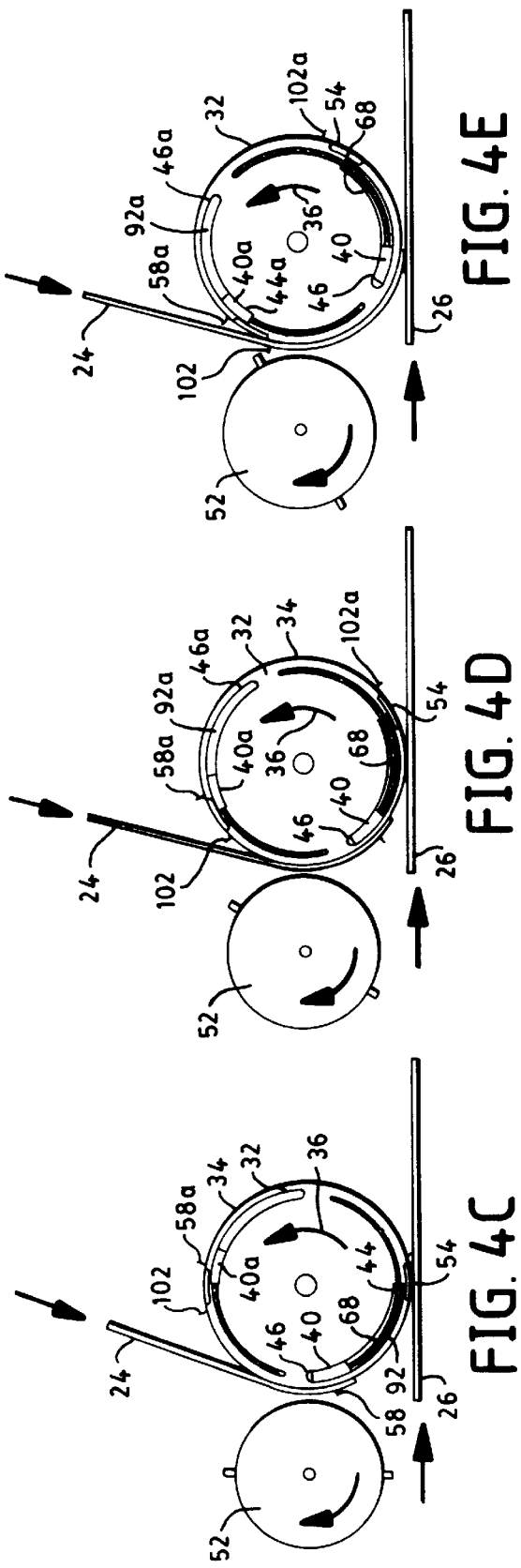

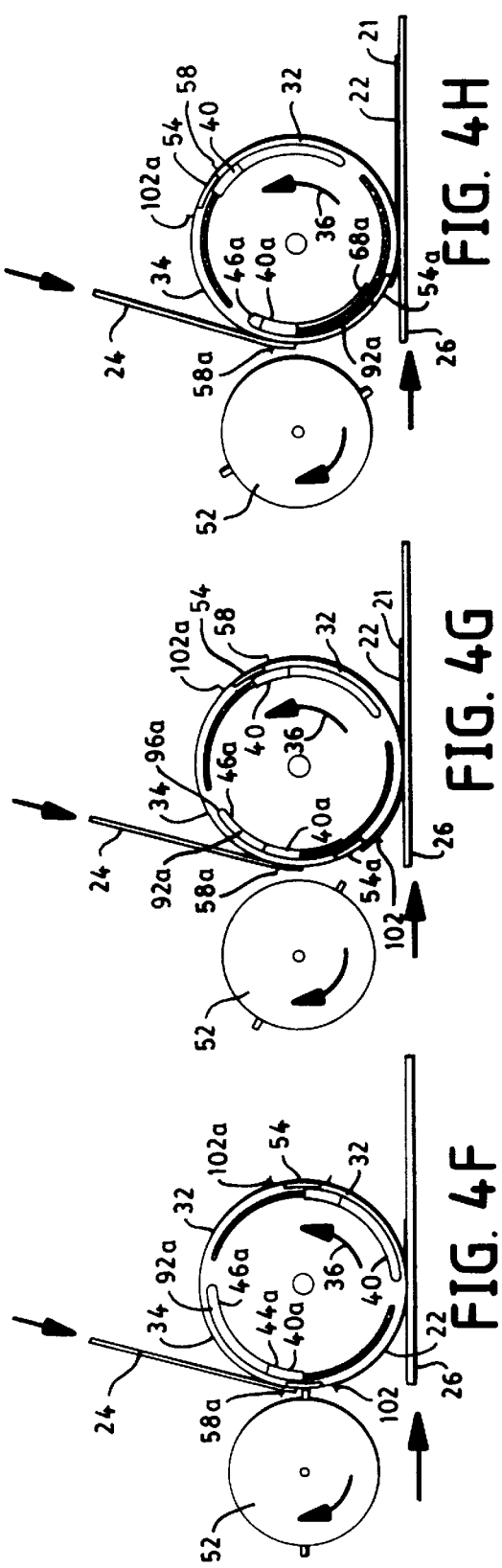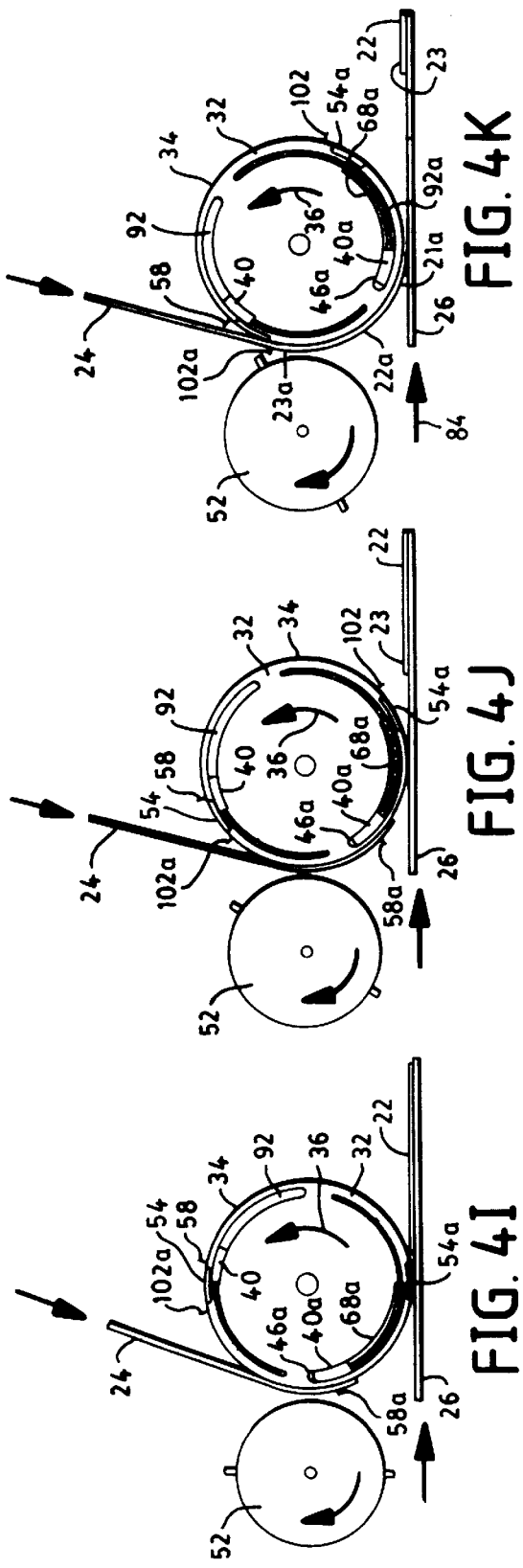

NON-CONTINUOUS COMPONENT APPLICATOR

FIELD OF THE INVENTION

The present invention relates to a technique for placing components onto a moving substrate. More particularly, the present invention relates to a method and apparatus for placing discrete components onto a moving substrate web.

BACKGROUND OF THE INVENTION

Articles, such as disposable diapers, generally have been manufactured by a process where discrete parts or components of different materials have been applied to a continuously moving product web of interconnected articles. The components can include, for example, leg elastics, waist elastics, patches, tapes and other fastener elements, such as hook-and-loop materials or snaps, or the like. Often, the speed at which the parts are fed into the process is not the same as the speed of the product web itself. Thus, the speed of the parts must be changed to match the speed of the product web to properly apply the parts without adversely affecting the process or the finished articles.

Several different conventional methods for changing the speed of a part or component of material such that it can be applied to a continuously moving web have been known to those skilled in the art. For example, one method has been known as the slip gap or slip cut method. A web of material, which is traveling at a slower speed than the moving web, is fed into a knife and anvil roll having a surface speed equal to the speed of the moving web. As the material is cut into discrete parts, vacuum in the anvil roll is activated to draw the parts of material to the surface of the anvil roll. The anvil roll then carries the parts to the moving web where the vacuum is released and the parts are applied to the moving web while both the parts and the moving web are traveling at the same speed.

Another method has utilized festoons to reduce the speed of the moving web to match the speed of the discrete parts of material to be applied to the web. The moving web is temporarily slowed down to the speed of the parts with the excess portion of the moving web gathering in festoons. The parts of material are then applied to the moving web while both the parts and the web are traveling at the same speed. The festoons are then released allowing the moving web to return to its original speed.

Another method has utilized a slider-crank mechanism to accomplish the speed change. The slider-crank mechanism utilizes concentrically mounted arms or linkages to receive the discrete parts of material, increase the speed of the parts to match the speed of the moving web and apply the parts to the moving web. The slider-crank mechanism is a special case of a four bar linkage system.

Finally, another such method to change the speed of a discrete part before it is applied to a moving web has utilized a cam actuated crank-follower mechanism. The cam actuated crank-follower mechanism comprises crank levers that are mounted on a rotatable driving plate. Each crank lever includes a cam follower on one end and a follower lever connected to the other end. The other end of the follower lever is connected to an applicator device which is mounted concentric with the driving plate's center of rotation. The cam follower remains in contact with a fixed cam that is also mounted concentric with the driving plate's center of rotation. As the driving plate rotates, the crank levers pivot as their cam followers follow the cam shape. As the crank levers pivot, the follower levers cause the applicator devices to speed up or slow down. An example of this method is described in U.S. Pat. No. 4,610,751 issued Sep. 9, 1986, to Eschler.

Conventional techniques, such as those described above, have exhibited several drawbacks. For example, as the discrete parts of material are transferred, the conventional techniques have not adequately regulated a tugging action applied to the parts. The less regulated tugging action may result in an undesired elongation or tearing of the parts. Where it has been desired to impart a desired amount of stretch to the transferred component, the conventional techniques have not been able to adequately control the amount of stretch applied to selected components. In addition, several of the conventional methods can provide substantial speed variations, but do not provide adequate periods of time where the speed of the transferred part remains constant for a sufficient duration. Thus, the characteristics of the discrete parts may be adversely affected because the surface speed of the transfer mechanism can excessively vary during the receiving and application process. Moreover, several of the conventional techniques have required excessive expense and time to adjust those techniques to accommodate changes in the size and speed of the discrete parts and to accommodate changes in the speed of the moving web change. Such changes are typically needed to generate various finished products different sizes. Consequently, there has been a continuing need for an inexpensive and adaptable apparatus for receiving discrete parts traveling at a speed and applying the parts to a web traveling at a different speed.

Additionally, there has been a continued need for an improved technique for receiving and applying of parts while particular, selected speeds are maintained substantially constant for a fixed duration. For example, it is desirable to apply the parts to the substrate web while the parts and substrate web are traveling at substantially the same surface speed. It is also desirable to have the leading edge of the part securely held during the application process. Such a constant speed dwell and leading edge placement can allow a more precise control of the length and placement of the part on the substrate web especially if the part is fragile and/or elastic.

BRIEF DESCRIPTION OF THE INVENTION

An apparatus aspect of the invention provides a distinctive device for intermittently applying a component onto a moving substrate. The apparatus includes a conveyor configured to provide the moving substrate at a selected substrate speed, and a transporter configured to deliver a component web at a selected component web speed which differs from the substrate speed. A rotatable applicator roll has an appointed rotation direction and an outside applicator surface. The applicator roll is configured to be rotated at a rate which provides to the applicator surface a surface speed which is substantially equal to the substrate speed. At least one deceleration carriage is assembled to rotate with the applicator roll and is configured to receive and hold a selected portion of the component web. The deceleration carriage is configured to translate along a carriage movement path from an appointed first position to an appointed second position while moving substantially opposite to the rotation direction, and is configured to be repositionable along a carriage return path to the first position. A divider coordinates with the applicator roll to intermittently separate the component web into individual component web segments.

A process aspect of the invention provides a distinctive method for intermittently applying a component onto a moving substrate. The method includes a rotating of an applicator roll having an appointed rotation direction and an outside applicator surface. The applicator roll is rotated at a rate which provides the applicator surface a surface speed which is substantially equal to a substrate speed of the moving substrate. The applicator roll has at least one deceleration carriage assembled to rotate with the applicator roll and configured to receive and hold a selected portion of a component web which is delivered to the applicator roll at a selected component web speed different than the substrate speed. The deceleration carriage is configured to translate along a carriage movement path from an appointed first position to an appointed second position while moving substantially opposite to the rotation direction of the applicator roll, and is configured to be repositionable along a carriage return path to the first position. A coordinated dividing of the component web intermittently separates the component web into individual web segment components.

As compared to conventional techniques, such as those described above, the various aspects of the present invention can provide more reliable operation when employed with a wider range of materials and composites. In particular, the present invention can provide improved operation when employed to apply discrete parts composed of elastomeric materials having a wider range of tensions, retractions and elongations. The various aspects of the present invention can also provide an improved ability to impart greater changes in speed to the applied part or component, and can provide an improved ability to maintain a desired matching of speeds between the component and its associated substrate for desired fixed durations. Thus, the use of the present invention in its various configurations can provide a more precise control of the length and placement of the appointed discrete part or component onto the moving web or other substrate.

BRIEF DESCRIPTION OF THE DRAWINGS

The present invention will be more fully understood and further advantages will become apparent when reference is made to the following detailed description of the invention and the accompanying drawings, in which:

FIGS. 4 through 4K representatively show a schematic of a series of sequential side elevational views of the invention in the process of applying first and second component web segments onto a moving substrate.

DETAILED DESCRIPTION OF THE INVENTION

The present invention can provide an apparatus and method for receiving discrete parts or components traveling at a certain speed and applying the parts to a web traveling at a different speed. More particularly, the invention can provide an apparatus and method for receiving discrete elongated elastic parts of a continuously moving web of elongated elastic material traveling at a first speed and applying the discrete elongated elastic parts onto a product web of interconnected disposable absorbent articles traveling at a different, second speed. The technique of the invention can be particularly useful for receiving discrete components of an elastomeric material, such as leg or waist elastics, and applying the components to a product web of interconnected disposable absorbent articles, such as disposable diapers. It should be readily apparent, however, that the technique of the invention would also be suitable for applying other component parts to a selected substrate web. It should be readily appreciated that the various components of the apparatus can be constructed from any suitable natural or synthetic material, such as metal or plastic, as long as the material is sufficiently strong and durable to accommodate the stresses generated during the operation of the process or apparatus.

Figure 1:
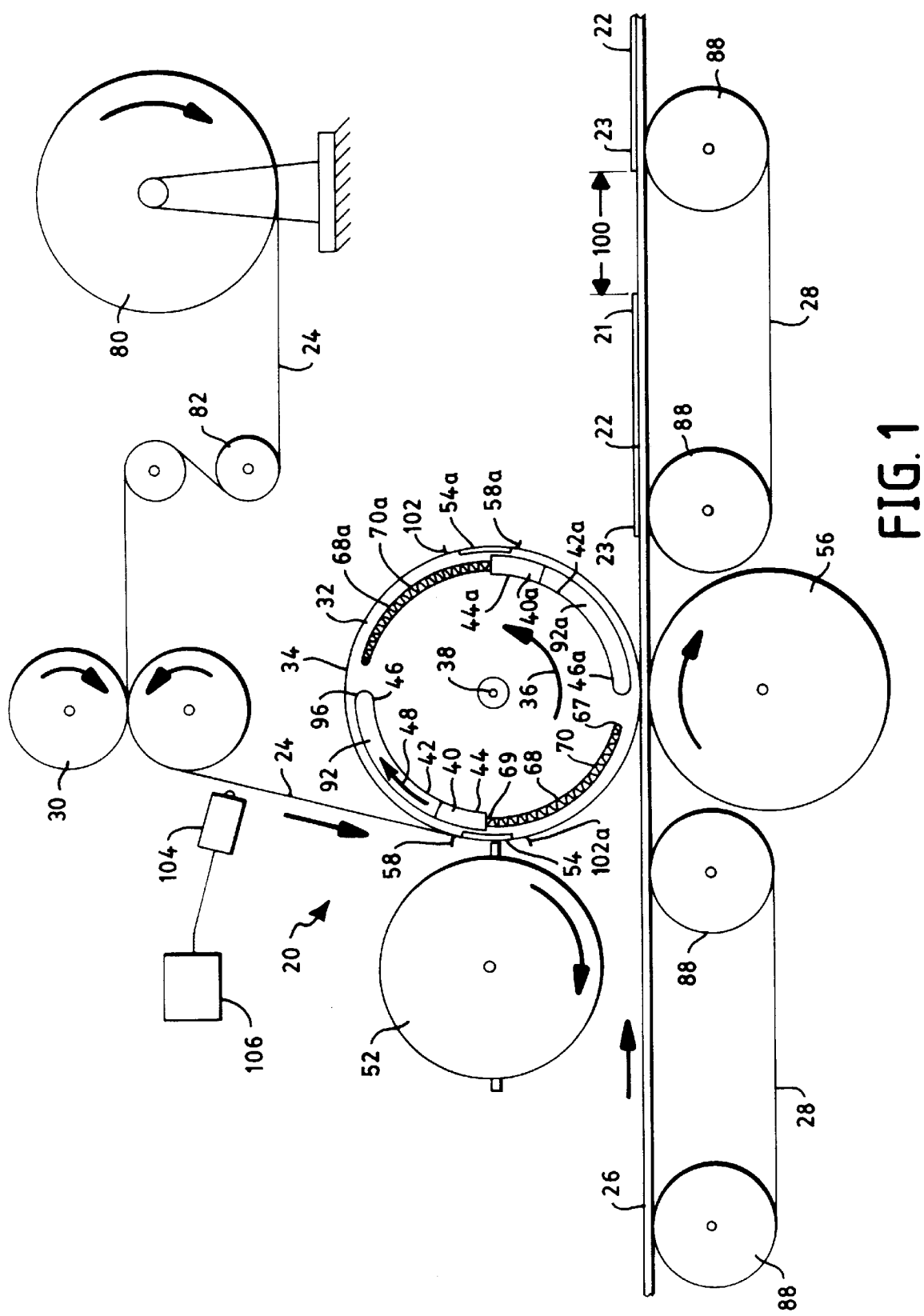
FIG. 1 representatively shows a schematic, side elevational view of the method and apparatus of the present invention.
Figure 1A:
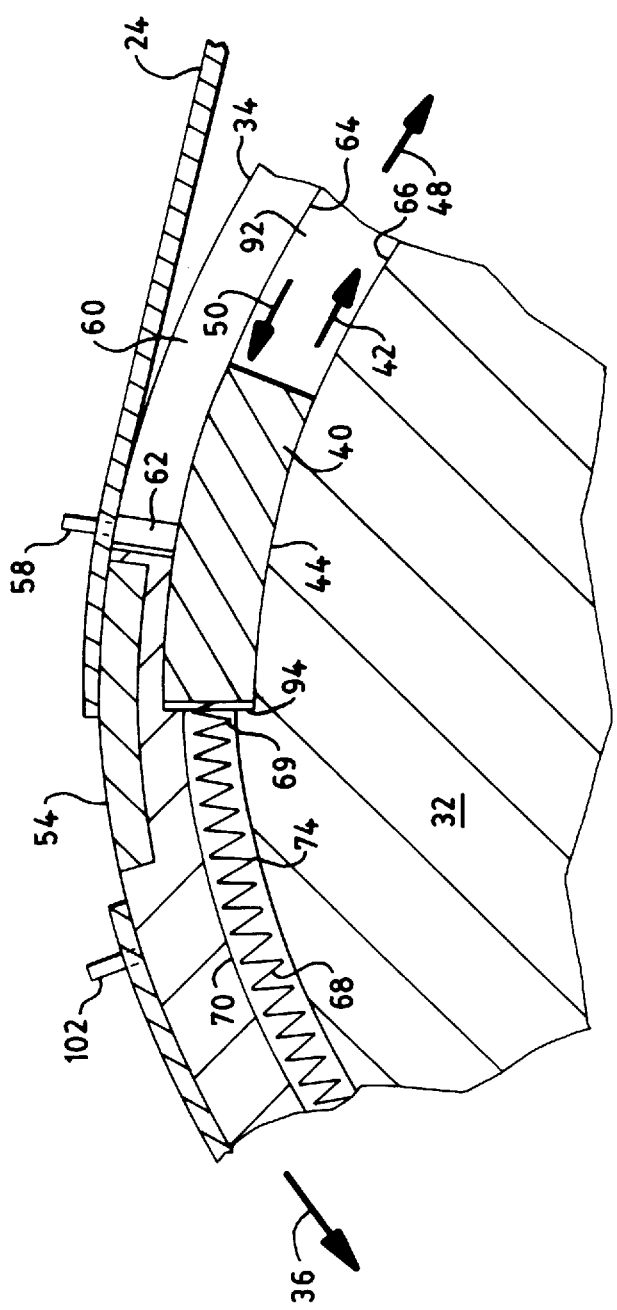
FIG. 1A representatively shows an enlarged side view of an deceleration carriage mounted in an applicator roll of the invention.

With reference to FIGS. 1 and 1A, a representatively shown method and apparatus 20 is configured for intermittently applying a component, such as one or more component web segments 22, onto a moving substrate 26. Desired aspects of the invention can be arranged to receive a substantially continuous component web and sequentially applying a series of separate, spaced-apart non-continuous component web segments onto a substantially continuously moving substrate. In the illustrated configuration, for example, the apparatus includes a conveyor 28 configured to provide the moving substrate 26 at a selected substrate speed, and a transporter 30 configured to deliver a component web 24 at a selected component web speed which differs from the substrate speed. A rotatable applicator roll 32 has an appointed rotational direction 36, and an outside applicator surface 34. The applicator roll is configured to be rotated at a rate which provides to the applicator surface 34 a surface speed which is substantially equal to the substrate speed. At least one deceleration carriage 40 is assembled to rotate with the applicator roll 32 and is configured to receive and hold a selected portion of the component web 24. The deceleration carriage is configured to translate along a carriage movement path 42 from an appointed first position 44 to an appointed second position 46 while moving substantially opposite to the rotation direction 36, and is configured to be repositionable along a carriage return path 50 to the first position 44. A divider, such as rotary cutter 52, coordinates with the applicator roll 32 to intermittently separate the component web 24 into individual component web segments 22.

Figure 2B:
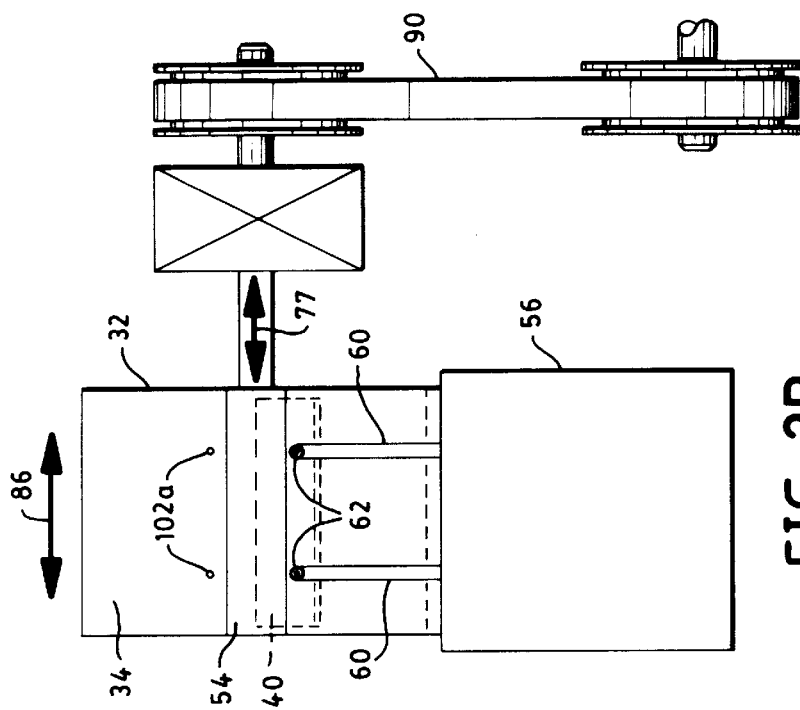
FIG. 2B representatively shows a schematic, end elevational view of the applicator roll system of FIG. 2.
Figure 2B:
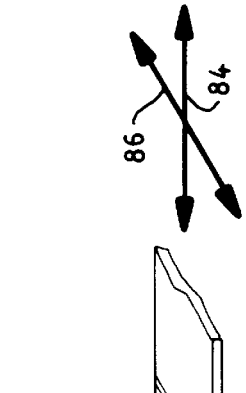

In the present description, various references may be made to a machine-direction and a cross-direction of the method and apparatus. For the purposes of the present description, the machine-direction 84 (FIG. 2A) at any particular local region of the method and apparatus is the direction along which the work material is being directed through the process equipment at that observed location. At any particular local region along the process and apparatus, the cross-direction 86 is substantially perpendicular to the local machine-direction, and lies substantially within the general plane of the appointed component or work material being directed through the process or apparatus.

In particular aspects of the invention, a single applicator roll 32 may include a plurality of deceleration carriage systems and associated components. In the illustrated configuration, for example, the representatively shown applicator roll 32 includes a pair of deceleration carriage systems and associated components, wherein like elements are identified with like numerals with an added "a" suffix. Optionally, three or more deceleration carriage systems may be incorporated into a single applicator roll 32.

In the various configurations of the invention, it should be readily appreciated that parameters, such as the diameter of the applicator roll 32, the rotational speed of the applicator roll, the speed at which the component web 24 is transported onto the applicator roll, and the length of the translation of the deceleration carriage 40 along the carriage movement path 42 between the first position 44 and the second position 46, can be adjusted to assemble the desired component 22 onto the moving substrate 26 with the desired separation distance 100 between the individual web segments 22.

In the representatively shown configuration, a directing system, such as provided by a system of guide rollers 82, provides a selected component web material from an appropriate component web supply 80. The component web material may, for example, be composed of materials made from woven or non-woven natural or synthetic fibers, cast or blown polyolefin films, elastomeric materials or the like. Alternatively, the component web may be composed of a matrix of woven or non-woven materials, polyolefin films and/or elastomeric materials. In desired aspects of the invention, the component web material may be an elastomeric material which is elastically stretchable and contractible along at least one direction. For example, the elastomeric material may be elastomerically stretchable along the machine-direction 84 (FIG. 2A) of the method and apparatus 20. Optionally, the material of the component web 24 may be elastomerically stretchable and contractible along the cross-direction 86, or along both the machine-direction and cross-direction of the method and apparatus to provide desired properties.

The shown component web 24 is substantially continuous, and has a predetermined series of appointed web segments 22 sequentially located along the length of the component web material. Each component web segment has an appointed leading edge region 21, and an appointed trailing edge region 23 positioned relatively downstream from its associated leading edge region.

The system of guide rollers 82 can provide an appropriate transporter 30 which is configured to substantially continuously deliver the component web 24 at a selected component web speed which differs from the speed of the substrate 26. In a desired aspect of the invention, the component web speed is less than the substrate speed. Optionally, the component web speed may be greater than the substrate speed.

In particular aspects of the invention, a ratio of the component web speed to the substrate speed is at least about 0.1:1. Alternatively, the speed ratio is at least about 0.3:1, and optionally is at least about 0.4:1. In other aspects of the invention, the speed ratio of the component web speed to the substrate speed can be not more than about 0.99:1. Alternatively, the speed ratio can be not more than about 0.8:1, and optionally can be not more than about 0.6:1 to provide improved performance characteristics.

A suitable conveyor 28, such as a mechanism which includes the representatively shown system of guide rollers 88, is configured to provide the moving substrate 26 at a selected substrate speed. The illustrated substrate is substantially continuous, but may be discontinuous, if desired. It should be readily appreciated that the substrate speed will be suitably selected to accommodate the desired operations performed on the selected work materials. In addition, it should be readily appreciated that the conveyor 28 may be provided by any conventional mechanism, such as rollers, belts, air guides, electromagnetic fields, and the like, as well as combinations thereof (not shown).

As representatively shown, the conveyor system can include a stomper roll 56 which is positioned adjacent to the applicator roll 32 and is configured to counter-rotate with respect to the applicator roll. The moving substrate 26 is transported into and through the nip region formed between the cooperating applicator and stomper rolls, and the stomper roll is operatively configured to urge the substrate 26 toward the applicator roll to facilitate the desired placement and attachment of the component web segments 22 onto the moving substrate 26. In the representatively shown arrangement, the stomper roll 56 is operably rotated with a suitable driving mechanism to provide a stomper roll surface speed which is substantially equal to the desired speed of the moving substrate 26. In addition, the surface of the stomper roll is constructed and arranged to cooperatively accommodate the presence and operation of mechanical components and mechanisms which may be arranged along the surface of the applicator roll 32. Where the applicator roll has pins or other protuberances projecting from the applicator roll surface, the stomper roll 56 can be configured with a penetratable surface for reconciling the presence of the protuberances while providing for an effective pressing of the substrate 26 against the appointed component web segments 22. For example the stomper roll surface may be composed of a resilient, readily penetratable, "self-healing" material, or may be configured with pocket or channel regions constructed and arranged to accept the placement of elements extending from the circumferential surface of the applicator roll.

The applicator roll 32 has a radial direction 76 (FIG. 2A) and a circumferential direction 78. In addition, the applicator roll has an axial direction 77 which extends perpendicular to the radial direction 76 and substantially parallel to an appointed axis of rotation 38 of the applicator roll. The applicator roll 32 is rotatable about the axis of rotation along an appointed rotational direction 36. Desirably, the axis of rotation is positioned along a central axis of the cylinder which defines the applicator roll. The applicator roll also includes an outside peripheral applicator surface 34 which extends along both the axial direction and the circumferential direction 78 of the applicator roll. The applicator roll is configured to be rotated at a rotational rate which provides to the applicator surface 34 a surface speed and direction which is substantially equal to the speed and direction of the moving substrate 26 within the nip region between the applicator and stomper rolls. For example, the representatively shown arrangement includes a drive system 90 (FIG. 2B) which is suitably coupled to the applicator roll 32 to rotate the applicator roll at the desired rotational rate. The drive system may include a mechanical engine, an electromagnetic motor, a powered line-shaft system, or the like, as well as combinations thereof (not shown).

At least one deceleration carriage 40 is assembled to rotate with the applicator roll 32. Alternatively, a plurality of deceleration carriages may be assembled to rotate with the applicator roll. In the illustrated arrangement, for example, a pair of deceleration carriages are assembled with the applicator roll. Optionally, three or more deceleration carriages may be incorporated, as desired. Each deceleration carriage is configured to receive and hold a selected portion of the advancing component web 24. The receiving and holding operations can be accomplished by any suitable mechanism or system. For example, the holding system can include at least one holding engagement pin, at least one selectively operating clamp, electromagnetic attraction fields, air jets, directed vacuum suction systems, and the like, as well as combinations thereof.

Figure 2:
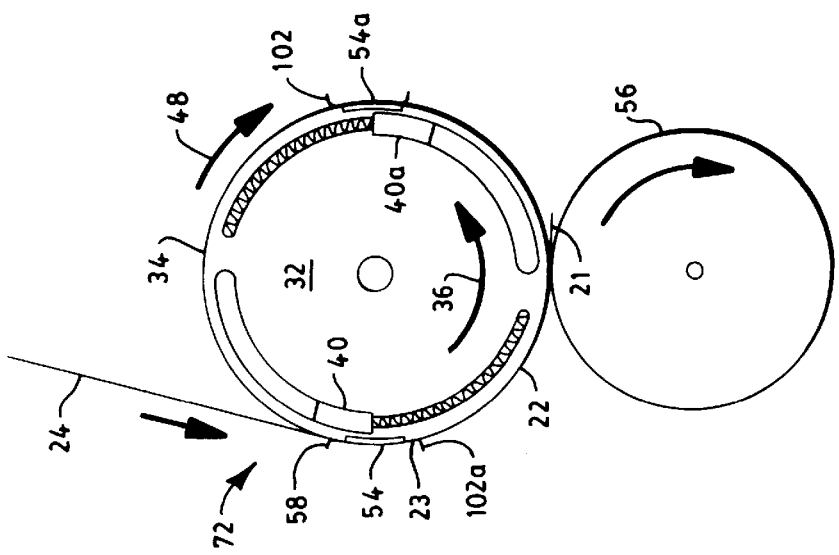
FIG. 2 representatively shows a schematic, side elevational view of an applicator roll system of the invention.
Figure 3:
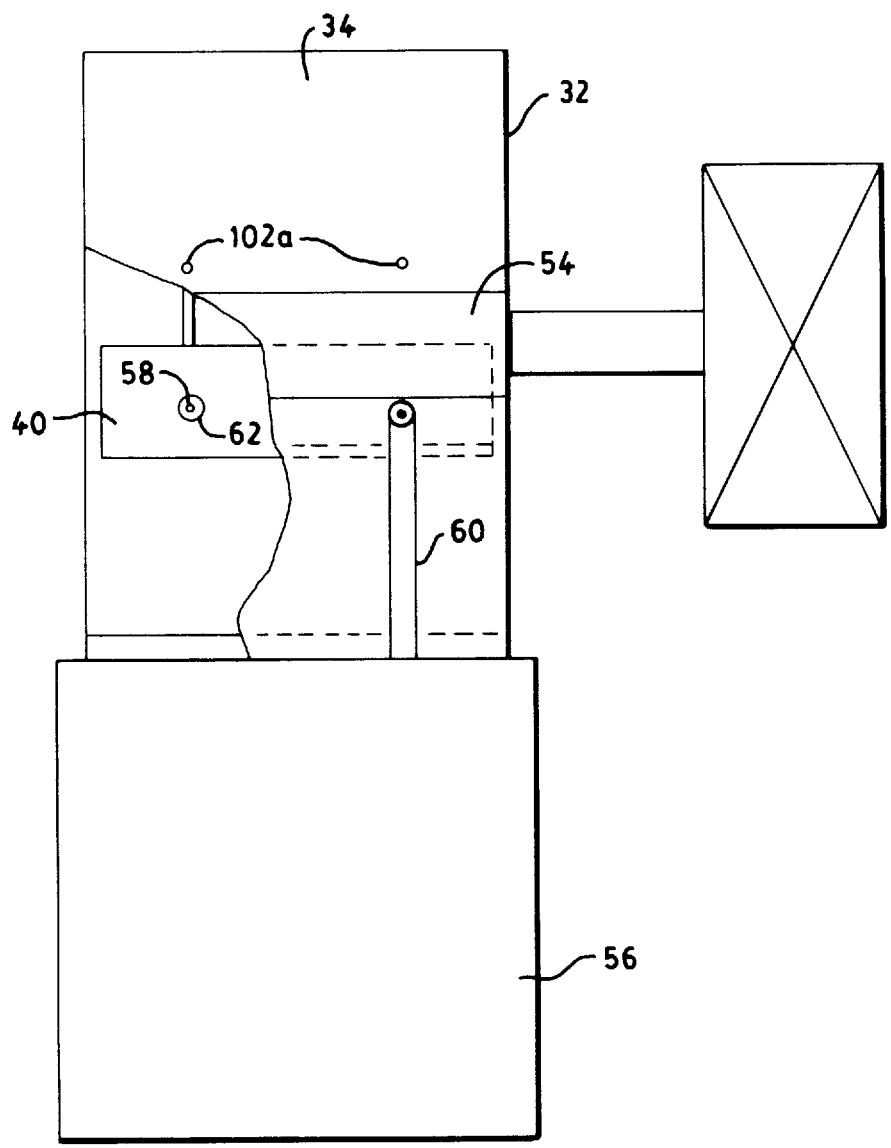
FIG. 3 representatively shows a schematic, partially cut-away, end view of the applicator roll of FIG. 2.

As representatively shown in FIGS. 1, 1A and 3, for example, each deceleration carriage 40 can be operatively received within a carriage slot 92 which extends circumferentially along the applicator roll 32 and is spaced by a discrete distance radially inward from the peripheral applicator surface 34. The carriage slot includes a first end 94 and a second end 96, and extends substantially along an arcuate line which is substantially parallel to the circumference of the applicator roll 32. With reference to the illustrated arrangement of FIGS. 1A and 2, for example, the carriage movement path 42 is substantially coincident with the carriage return path 50. Alternatively, the carriage movement path 42 and carriage return path 50 can be constructed and arranged to be noncoinciding, separate paths, as desired.

With reference again to FIGS. 1, 1A and 3, each carriage slot 92 has a predetermined carriage slot length 98. The carriage slot length can be employed to control desired characteristics of the invention. For example, the carriage slot length can be employed to control the characteristics of the attached length of the component web segment 22 onto the moving substrate 26, the applied tension within the component web segment, and the separation distance between successive component web segments.

If, for example, the carriage slot length 98 is made longer, the attached length of the component web segment 22 can be made shorter. In addition, there can be less applied tension in the web segment 22, and the separation distance between immediately successive component web segments can be increased if all other apparatus parameters and dimensions are held constant.

If the carriage slot length 98 is made shorter, the attached length of the component web segment 22 can be made longer. In addition, there can be more applied tension in the web segment 22, and the separation distance between immediately successive component web segments can be decreased if all other apparatus parameters and dimensions are held constant.

The radially extending height of the carriage slot 92 is appropriately selected to accommodate and control the desired movement of the deceleration carriage 40 within the carriage slot. Accordingly, each carriage slot 92 can include a radially outward bearing surface 64 and/or a radially inward bearing surface 66 to suitably guide and direct the movements of their associated deceleration carriage 40.

It should be readily appreciated that the deceleration carriage 40 need not be located within a carriage slot arrangement. For example, the deceleration carriage may be located and configured to travel substantially along the outer peripheral surface of the applicator roll 32.

Desirably, a suitable guiding system is employed to direct and maintain the movement of the deceleration carriage 40 along the desired movement path 42 and return path 50. For example, an appropriate system of channels, slots, rails, guide rods, electromagnetic fields, jet systems, and the like, as well as combinations thereof (not shown), may be employed.

With reference to the illustrated configuration of FIGS. 1, 1A and 3, for example, the guiding mechanism can be provided by a system of guide slots 60 and guiding rods 62. The carriage guiding slots 60 are formed into the outer peripheral surface of the applicator roll 32, and extend radially inward to intersect with the corresponding carriage slot 92. The illustrated arrangement of the invention has a pair of substantially parallel guiding slots associated with each of the shown carriage slots 92. Alternatively, any other number of guiding slots may be employed. In the shown configuration, the circumferential length of each guiding slot 60 is approximately equal to the slot length 98 of its associated carriage slot 92. A guiding rod extends through each of the guiding slots 60 and is fixedly attached to its corresponding deceleration carriage 40. The axial width of each carriage guiding slot 60 is approximately equal to the diameter or axial width of its corresponding guiding rod 62. As a result, the side walls of each guiding slot 60 provide a bearing surface for directing the guiding rods 62 and their associated deceleration carriage 40 along the desired movement paths 42 and return paths 50.

During the operation of the invention, a discrete carriage translation drive mechanism 72 (FIG. 2) can be employed to move the deceleration carriage 40 from its appointed first position 44 to its appointed second position 46. Suitable driving mechanisms can include, for example, mechanical drive systems, electromechanical drive systems, gas pressure drive systems, hydraulic drive systems, electromagnetic fields, and the like, as well as combinations thereof. Mechanical drive systems can, for example, include a cam mechanism constructed and arranged to produce the desired movement of the deceleration carriage from its appointed first position 44 to its appointed second position 46.

In the example of the representatively shown configuration, the translating drive mechanism is provided by a cooperating combination of the applicator roll operating mechanisms, and the transporter system for the component web 24. More particularly, the translating drive mechanism is provided for by a combination of the peripheral surface speed at the applicator surface 34 of the applicator roll, a relatively slower component web speed at which the component web is delivered to the applicator roll 32, the capture and holding of leading and trailing sections of the appointed component web segments 22, and the resultant tension generated within the component web 24 during the operation of the process and apparatus of the invention.

In the various configurations of the invention, a suitable holding device, such as provided by the representative array of holding pins 58, is operatively connected and attached to each deceleration carriage 40. Various types of holding mechanisms can be employed. For example, the holding engagement mechanism may include a system of operative pins, hooks, clamps, gripping devices, gas pressure jets, directed vacuum suction systems, electromagnetic fields, and the like, as well as combinations thereof (not shown).

In the illustrated configuration, for example, the holding device includes a system of engagement pins 58 which are connected and attached to extend radially outward from each of the guiding rods 62. The engagement pins project above the applicator surface 34 and are appropriately configured to penetrate into and/or through the section of the component web 24 which is appointed for holding. As a result, there is a substantially non-slip engagement between the held section of the component web and its associated engagement and holding mechanism.

With the various configurations of the invention, a carriage return drive can be configured to reposition the deceleration carriage 40 along the desired carriage return path 50 to the first position 44 of the deceleration carriage. Suitable driving mechanisms can include, for example, mechanical drive systems, electromechanical drive systems, gas pressure drive systems, hydraulic drive systems, electromagnetic fields, and the like, as well as combinations thereof. Mechanical drive systems can, for example, include a cam mechanism which is constructed and arranged to produce the desired movement of the deceleration carriage along its return path to the first position 44.

Figure 2A:
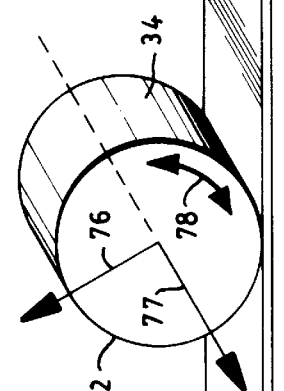
FIG. 2A representatively shows an isometric view of the applicator roll system of the invention.

With reference to the representatively shown arrangement of FIGS. 1A and 2, for example, the carriage return drive 74 can be provided by a mechanical spring system which includes a spring 68 and an associated spring slot extension 70. One end of the spring is affixed to the body of the applicator roll, and the opposite end of the spring is affixed to the deceleration carriage. In the shown configuration, the spring slot 70 extends substantially along a circumferential line which is substantially parallel to the applicator surface 34 of the applicator roll 32. The size of the spring slot 70 is suitably selected to accommodate placement of the spring 68 therein, and to allow a substantially free extension and contraction of the spring. The length of the spring slot 70 and the spring constant of the spring 68 are suitably selected to apply a desired tension onto the component web 24 and to provide a suitable, operative force which powers or otherwise actuates the carriage return drive and operatively urges the deceleration carriage 40 back to its first position 44 during the operation of the process and apparatus.

In the representatively shown configuration of the invention, spring 68 is operated in its tension mode. Alternatively, the spring may be operated in a compression mode. Accordingly, the location of the spring 68 and its corresponding spring slot 70 would be appropriately repositioned such that the movement of the deceleration carriage 40 in its counter-rotational, retrograde direction 48 operatively compresses the spring 68 during the deceleration movement of the carriage 40.

In the illustrated configuration, the spring slot 70 operatively intersects with the carriage slot 94. A fixed end portion 67 (FIG. 1) of the spring 68 is suitably connected and affixed to a base end of the spring slot 70. The spring 68 extends circumferentially through the spring slot 70 and into the carriage slot 94, and is operatively connected and attached to the deceleration carriage 40. It should be readily appreciated that the moveable end portion 69 of the spring may be directly or indirectly attached to the deceleration carriage.

The various configurations and aspects of the invention can include a divider which operatively synchronizes and coordinates with an applicator roll 32 to intermittently separate the component web into individual component web segments 22 having desired size and operational characteristics. With reference to the representatively shown arrangement of FIG. 1, for example, the divider can include a rotary cutter 52 and one or more cooperating anvil plates 54. Alternatively, the divider may be provided by a cutting jet of directed fluid, a laser, another directed energy beam, or the like, as well as combinations thereof not shown.

The illustrated configuration has the anvil plates 54 connected and affixed to the peripheral surface of the applicator roll 32. The anvil plates can be positioned adjacent to and rotationally preceding the terminal ends of the guide slots 60 (FIG. 2B), and can be located approximately superjacent the appointed first position 44 of each deceleration carriage 40. Desirably, the anvil plates are composed of a material having suitable durability and hardness, such as hardened metal. The rotary cutter 52 is appropriately timed and coordinated to engage knife portions of the cutter with an appointed anvil plate each time that the anvil plate passes by the location of the rotary cutter 52. Accordingly, the divider operatively defines and produces a component web segment 22 which extends between the held, leading edge portion of the component web and the divided and separated, trailing edge portion of the component web which is subsequently worked on by the rotary cutter.

Particular aspects of the invention can include a supplemental holding device which is positioned generally adjacent to and ahead (relatively upstream) of each anvil plate 54. Accordingly, the illustrated configuration of the invention has a first supplemental holding device provided by a second array of pins 102 which are located relatively upstream from the second anvil plate 54a, and has a second supplemental holding device provided by a second array of pins 102a which are located relatively upstream from the first anvil plate 54. Various types of alternative holding mechanisms can be employed for the supplemental holding device. For example, the supplemental holding mechanism may include a system of operative hooks, clamps, gripper devices, gas pressure jets, directed vacuum suction systems, electromagnetic fields, and the like, as well as combinations thereof (not shown).

In the illustrated configuration, for example, the supplemental holding mechanism includes a system of engagement pins 102 which are connected and fixedly attached to extend radially outward from the applicator roll surface 34. The engagement pins project above the applicator surface and are appropriately configured to penetrate into and/or through the relatively trailing section 23 of the component web segment 22 which is appointed for holding. As a result, there is a substantially non-slip engagement between the held section of the component web and its associated supplemental holding device.

Prior to the dividing operation, the supplemental holding device engages and releasably attaches to the trailing edge region 23 of each previously advancing component web segment 22. Prior to the dividing operation, the leading edge region 21 of the sequentially following component web segment is additionally and cooperatively engaged by the next, sequentially following carriage engagement mechanism provided by the holding pins 58. Once the operation of the supplemental holding device (e.g. the system of engagement pins 102) and the sequentially following carriage holding device (e.g. the system of engagement, holding pins 58) have operatively occurred, the selected divider, such as the rotary knife cutter 52 can strike the portion of the component web 24 which is positioned over the anvil plate 54, and can effect the desired separation of the component web into individual component web segments 22.

As the applicator roll 32 continues its rotation along the rotational direction 36, the applicator surface positions and contacts each component web segment 22 onto the moving substrate 26 to operatively position and deposit each web segment on the moving substrate. When the leading edge region 21 of each component web segment is contacted and applied onto the moving substrate 26, the selected holding mechanism disengages from the leading edge region 21 of the associated component web segment, and leaves the leading edge region assembled onto the moving substrate 26. In addition, the carriage return drive 74 (FIG. 1A), such provided for by the representative spring 68, redirects the deceleration carriage from its second position back to its appointed first position 44.

As the applicator roll 32 continues its rotation, the assembly of the web segment 22 onto the moving substrate also continues. Since the peripheral speed of the applicator surface 34 is operatively configured to be substantially equal to the speed of the moving substrate 26 during the placement of substantially the entire machine-direction length of the web segment, there can be a substantially non-slip assembly of each component web segment 22 onto the moving substrate 26. After the trailing edge region 23 of the web segment 22 has been assembled onto the moving substrate 26, the associated supplemental holding mechanism composed of the system of pins 102 operatively disengages from the web segment trailing edge region 23 and leaves the individual web segment 22, along with any induced elastomeric stretch, assembled onto the moving substrate. During the assembly of web segment 22 onto the substrate 26, the sequentially following web segment 22a is being formed along the applicator surface 34 of the applicator roll.

With reference to FIG. 1 and the series of FIGS. 4 through 4K, the method and apparatus of the invention can separate the substantially continuous component web 24 into a desired series of spaced-apart non-continuous component web segments 22, and can operably place and apply each of the component web segments 22 onto desired spaced-apart locations on the moving substrate 26. The individual component web segments 22 are spaced apart by a selected spacing distance 100 (FIG. 1). In particular aspects, the method and apparatus of the invention can be configured to impart a selected level of tension within each of the component web segments 22, and can be configured to impart a selected amount of elastomeric elongation to each of the component web segments, as desired. In FIGS. 4 through 4K, the relative interval between each successive Figure represents approximately 30 degrees of rotation of the applicator roll. The transporter 30 and the deceleration carriage 40 are cooperatively configured to tension and stretch the component web 24.

During a representative operation of the invention, an initially advancing, leading edge portion 21 (FIG. 1) of a designated, first web segment of the component web 24 is operatively engaged and captured by the selected engagement mechanism, such as the holding pins 58, associated with each deceleration carriage 40. With reference to FIG. 3 and FIGS. 4 through 4E, for example, a first holding mechanism has an engagement mechanism provided by the system of engagement pins 58. The engagement pins penetrate into the held portion of the component web and engage the web with a substantially non-slip, releasable attachment (FIG. 4). The releasable attachment between the engagement pins 58 and the held portion of the component web is positioned substantially at the applicator surface 34, and the applicator roll 32 continues to rotate along the rotational direction 36 at its preselected, predetermined rotational speed. The component web 24, however, is provided onto the applicator roll 32 at a web speed which is less than the peripheral speed at the applicator surface 34. Due to the difference between the speed of the applicator surface 34 and the speed of the advancing component web 24, a tension force is generated within the component web 24. When the tension within the component web 24 exceeds the force exerted by the spring 68 onto the deceleration carriage 40, the tension within the component web pulls the deceleration carriage 40 in a retrograde direction 48 from the first position 44 of the deceleration carriage 40 within its carriage slot 92 (FIGS. 4A–4B). The deceleration carriage 40 then moves within the carriage slot 92 along its movement path 42 from the first position 44 toward the second position 46 of the movement path. When the deceleration carriage 40 reaches its appointed second position 46 at the second end 96 of the carriage slot 92, the deceleration carriage stops its retrograde movement along the movement path 42 (FIGS. 1A and 4C).

As the applicator roll 32 continues its rotation, a first appointed component web segment 22 (FIG. 1) is laid onto the peripheral surface 34 of the applicator roll (FIGS. 4C through 4D). When the first appointed web segment 22 has been fully positioned onto the surface of the applicator roll, a first supplemental holding mechanism composed of the representatively shown system of engagement pins 102 capture the trailing region 23 of the first web segment 22 (FIG. 4E).

As the applicator roll 32 continues its rotation along the rotational direction 36, the applicator surface continues to contact the first component web segment 22 onto the moving substrate 26 to operatively position and deposit the first web segment on the moving substrate. When the leading edge region 21 of the component web segment 22 is contacted and applied onto the moving substrate 26, the first holding pin mechanism 58 disengages from the leading edge region of the component web segment, and leaves the leading edge region assembled onto the moving substrate 26. As the applicator roll 32 further continues its rotation, the assembly of the web segment 22 onto the moving substrate also continues. After the trailing edge region 23 of the first web segment 22 has been assembled onto the moving substrate 26, the first supplemental holding mechanism composed of pins 102 operatively disengages from the web segment trailing edge region 23 and leaves the individual web segment 22, along with any induced elastomeric stretch, assembled onto the moving substrate. During the assembly of the first web segment 22 onto the substrate 26, the sequentially following, second web segment 22a (FIG. 4K) is being formed along the applicator surface 34 of the applicator roll.

With reference to FIGS. 4F through 4K, the continuing rotation of the applicator roll 32 operably engages a second holding device provided by a second system of engagement pins 58a. The second array of engagement pins penetrate into the leading section 21a of the next appointed component web segment 22a and engages the web with a substantially non-slip, releasable attachment (FIG. 4F). The releasable attachment between the engagement pins 58a and the held portion of the component web is again positioned substantially at the applicator surface 34, and the applicator roll 32 continues to rotate along the rotational direction 36 at its preselected, predetermined rotational speed. The component web 24, however, continues to be provided onto the applicator roll 32 at a web speed which is less than the peripheral speed at the applicator surface 34. Due to the difference between the speed of the applicator surface 34 and the speed of the advancing component web 24, the tension force is again generated within the component web 24. When the tension within the component web 24 exceeds the force exerted by the spring 68a onto the second deceleration carriage 40a, the tension within the component web again pulls the second deceleration carriage in a retrograde direction 48 from the first position 44a of the deceleration carriage 40a within its associated, second carriage slot 92a. The deceleration carriage 40a then moves within the carriage slot 92a along its movement path 42a (FIG. 1) from the first position 44a toward the second position 46a of the movement path (FIGS. 4G–4H). As a result of the retroceding movement of the second deceleration carriage 40a, there is a space extending along the machine-direction 84 of the substrate 26 upon which no component web material is applied. When the deceleration carriage 40a reaches its appointed second position 46a at the second end 96a of the carriage slot 92a, the deceleration carriage stops its retrograde movement along the movement path 42a.

As the applicator roll 32 continues its rotation, the second appointed component web segment 22a is laid onto the peripheral surface 34 of the applicator roll (FIGS. 4I–4K). When the second appointed web segment 22a has been fully positioned onto the surface of the applicator roll, a second supplemental holding device composed of the representatively shown system of engagement pins 102a a capture the trailing region 23a of the second web segment 22a.

The representative supplemental holding mechanism provided by the pins 102a is positioned adjacent to and ahead of the next returning, first anvil plate 54. Prior to the subsequent, second dividing operation, the supplemental holding pins 102a engage and releasably attach to the trailing edge region 23a of the preceding component web segment 22. Prior to the second dividing operation, the leading edge region 21a of the sequentially following component web segment 22a is also engaged by the sequentially returning, first holding pin mechanism 58. Once the operation of the supplemental holding mechanism (e.g. pins 102a) and the sequentially following, holding mechanism (e.g. pins 58) have operatively occurred, the selected divider, such as the rotary knife cutter 52 can strike the portion of the component web 24 which is positioned over the anvil plate 54a, and can effect the desired separation of the component web into another component web segment 22a.

As the applicator roll 32 continues its rotation along the rotational direction 36, the applicator surface contacts the second component web segment 22a onto the moving substrate 26 to operatively position and deposit each web segment on the moving substrate. When the leading edge region 21a of the second component web segment is contacted and applied onto the moving substrate 26, the second holding pin mechanism 58a disengages from the leading edge region of the second component web segment, and leaves the leading edge region assembled onto the moving substrate 26.

As the applicator roll 32 further continues its rotation, the assembly of the web segment 22a onto the moving substrate also continues. After the trailing edge region 23a of the second web segment 22a has been assembled onto the moving substrate 26, the supplemental holding system of pins 102a operatively disengages from the web segment trailing edge region 23 and leaves the individual web segment 22, along with any induced elastomeric stretch, assembled onto the moving substrate. Thereafter, it is readily apparent that the above-described sequence of operations can be continually repeated, as desired.

In particular aspects of the invention, the process and apparatus can be suitably configured to impart a desired level of elastomeric elongation to the component web segment 22 which is releasably attached between the engagement pin system 58 and its following supplemental holding pin system 102. In particular, if the retrograde movement of the deceleration carriage 40 is stopped within the applicator roll 32 before the separating operation, the leading edge region 21 of the component web segment 22 will then begin to move at the peripheral speed at the applicator surface 34. Since the peripheral speed is greater than the component web speed, an elastomeric stretching operation can be imparted to the component web segment which is releasably held on the peripheral surface of the applicator roll 32. The amount of elastomeric stretch, as measured by percent elongation with respect to the unstretched length, can be controlled by adjusting one or more of the following parameters: the transport speed of the component web relative to the surface speed of the outside, peripheral surface 34 of the applicator roll 32; the first position 44 and second position 46 of the carriage movement path; the carriage translation drive mechanism 72 (FIG. 2); and carriage return drive mechanism 74.

Desirably, each individual web segment 22 is operably attached to the substrate 26 at its desired location along the machine-direction of the substrate. The desired attachment can be generated by applying any suitable attachment mechanism. Appropriate attachment mechanisms can, for example, include adhesive bonds, sonic bonds, thermal bonds, cohesive bonds, pins, staples, rivets, and the like, as well as combinations thereof.

The representatively shown arrangement, for example, employs an adhesive bonding system which includes an adhesive applicator 104 and a suitable, cooperating adhesive supply 106. The applicator can be of any operative design, and can be configured to apply any desired pattern of adhesive, such as lines, swirl patterns, spray patterns and the like, as well as combinations thereof. In addition, the applicator 104 can be configured to apply any operative type of bonding material, such as a cohesive material, a cold adhesive, a hotmelt adhesive, a pressure-sensitive adhesive and the like, as well as combinations thereof. The shown configuration of the invention has the adhesive applicator located relatively upstream from the applicator roll 32 and is arranged to apply the selected adhesive onto appointed portions of the component web 24. Alternatively, the invention may be configured to apply the selected adhesive onto appointed portions of the substrate 26.

Having thus described the invention in rather full detail, it will be readily apparent that various changes and modifications may be made without departing from the spirit of the invention. All of such changes and modifications are contemplated as being within the scope of the present invention.

What is claimed is:

1. An apparatus for intermittently applying a component onto a moving substrate, said apparatus comprising:

a conveyor configured to provide said moving substrate at a selected substrate speed;

a transporter configured to deliver a component web at a selected component web speed which differs from said substrate speed;

a rotatable applicator roll having an appointed rotational direction and an outside applicator surface, said applicator roll configured to be rotated at a rate which provides to said applicator surface a surface speed which is substantially equal to said substrate speed;

at least one deceleration carriage assembled to rotate with said applicator roll and configured to receive and hold a selected portion of said component, said deceleration carriage configured to translate along a carriage movement path from an appointed first position to an appointed second position while moving in a retrograde direction which is substantially opposite to said rotation direction, and configured to be repositionable along a carriage return path to said first position, said deceleration carriage located in a slot formed in said applicator roll and said deceleration carriage configured to translate along said carriage movement path in said slot; and a divider which coordinates with said applicator roll and intermittently separates said component web into an individual component web segment.

2. An apparatus as recited in claim 1, wherein said carriage return path substantially coincides with said carriage movement path.

3. An apparatus as recited in claim 1, wherein said component web speed is less than said substrate speed.

4. An apparatus as recited in claim 1, wherein a ratio of said component web speed to said substrate speed is at least about 0.1:1.

5. An apparatus as recited in claim 1, wherein said carriage movement path is an arcuate path.

6. An apparatus as recited in claim 1, wherein said carriage movement path is an arcuate path defined by a section of said applicator roll.

7. An apparatus as recited in claim 1, further comprising a guide for maintaining said deceleration carriage on said carriage movement path.

8. An apparatus as recited in claim 1, wherein said carriage movement path is an arcuate path which is substantially parallel to a circumference of said applicator roll.

9. An apparatus as recited in claim 1, wherein said divider includes a rotary cutter which intermittently engages with said applicator roll.

10. An apparatus as recited in claim 1, wherein said divider coordinates with said applicator roll to intermittently separate a section of said component web into individual web segments while said section of component web is positioned on said outside surface of said applicator roll.

11. An apparatus as recited in claim 1, wherein said deceleration carriage is configured to hold said selected portion of said component web with at least one engagement pin.

12. An apparatus as recited in claim 1, wherein said deceleration carriage is configured to hold said selected portion of said component web with at least one engagement pin which is configured to penetrate said component web.

13. An apparatus as recited in claim 1, wherein said deceleration carriage is configured to hold said selected portion of said component web with at least one clamp.

14. An apparatus as recited in claim 1, wherein said divider intermittently separates said component web into said individual component web segment after said deceleration carriage has moved along said carriage movement path in said retrograde direction from said first position to said second position and before said deceleration carriage is repositioned along said carriage return path to said first position.

15. An apparatus as recited in claim 1, further comprising a drive mechanism which is configured to translate said deceleration carriage along said carriage movement path from said first position to said second position.

16. An apparatus as recited in claim 1, further comprising a mechanical drive which is configured to translate said deceleration carriage along said carriage movement path from said first position to said second position.

17. An apparatus as recited in claim 1, further comprising an electromechanical drive which is configured to translate said deceleration carriage along said carriage movement path from said first position to said second position.

18. An apparatus as recited in claim 1, further comprising an electronically coupled drive which is configured to translate said deceleration carriage along said carriage movement path from said first position to said second position.

19. An apparatus as recited in claim 1, further comprising a cam mechanism which is configured to translate said deceleration carriage along said carriage movement path from said first position to said second position.

20. An apparatus as recited in claim 1, further comprising a return drive mechanism which is configured to translate said deceleration carriage along said carriage movement path from said first position to said second position.

21. An apparatus as recited in claim 1, further comprising a mechanical return drive which is configured to translate said deceleration carriage along said carriage movement path from said first position to said second position.

22. An apparatus as recited in claim 1, further comprising an electromechanical return drive which is configured to translate said deceleration carriage along said carriage movement path from said first position to said second position.

23. An apparatus as recited in claim 1, further comprising an electronically coupled, return drive which is configured to translate said deceleration carriage along said carriage movement path from said first position to said second position.

24. An apparatus as recited in claim 1, further comprising a cam mechanism which is configured to reposition said deceleration carriage along said carriage return path to said first position.

25. An apparatus as recited in claim 1, further comprising a spring system which is configured to reposition said deceleration carriage along said carriage return path to said first position.

26. An apparatus as recited in claim 1, further comprising a spring system which is arranged to extend substantially along said movement path when said deceleration carriage is at its first position, and is configured to reposition said deceleration carriage along said carriage return path to said first position.

27. An apparatus as recited in claim 1, wherein an amount of said stretch in each said web segment component is controlled with said moving of said deceleration carriage in said retrograde direction.

28. An apparatus as recited in claim 1, wherein a difference between said component web speed provided by the transporter and said surface speed provided at the applicator surface is configured to tension said component web between said transporter and said deceleration carriage after said deceleration carriage has moved in said retrograde direction.

29. An apparatus as recited in claim 1, wherein a difference between said component web speed provided by the transporter and said surface speed provided at the applicator surface is configured to tension and stretch said component web between said transporter and said deceleration carriage after said deceleration carriage has moved in said retrograde direction.

30. An apparatus as recited in claim 1, wherein a spring is located in said applicator roll and connected to said deceleration carriage to reposition said deceleration carriage in said slot along said carriage return path.

31. An apparatus as recited in claim 30, wherein said spring is tensioned when said deceleration carriage is translated along said carriage movement path from said first position to said second position while moving in said retrograde direction.

32. A method for intermittently applying a component onto a moving substrate, comprising the steps of:
rotating an applicator roll having an appointed rotation direction and an outside applicator surface, said applicator roll rotated at a rate which provides to said applicator surface a surface speed which is substantially equal to a substrate speed of said moving substrate, said applicator roll having at least one deceleration carriage assembled to rotate with said applicator roll and configured to receive and hold a selected portion of a component web which is delivered to the applicator roll at a selected component web speed different than said substrate speed, said deceleration carriage configured to translate along a carriage movement path from an appointed first position to an appointed second position while moving in a retrograde direction which is substantially opposite to said rotation direction, said deceleration carriage repositionable along a carriage return path to said first position, said deceleration carriage located in a slot formed in said applicator roll, and said deceleration carriage configured to translate along said carriage movement path in said slot; and intermittently separating said component web into an individual component web segment.

33. A method as recited in claim 32, which further includes a positioning and depositing of said web segment components onto said moving substrate.

34. A method as recited in claim 32, wherein a difference between said component web speed provided by the transporter and said surface speed provided at the applicator surface is configured to tension and stretch said component web between said transporter and said deceleration carriage after said deceleration carriage has moved in said retrograde direction and, an amount of said stretch in each said web segment component is controlled with said moving of said deceleration carriage in said retrograde direction.

35. A method as recited in claim 32, wherein said intermittently separating of said component web further includes intermittently separating said component web after said deceleration carriage has moved along said carriage movement path in said retrograde direction from said first position to said second position and before said deceleration carriage is repositioned along said carriage return path to said first position.

* * * * *